United States Patent
Duncan et al.

(10) Patent No.: US 8,722,811 B2
(45) Date of Patent: May 13, 2014

(54) ADHESION PROMOTING COMPOUND

(75) Inventors: Robert Hume Duncan, Cleveland (GB); Arran Alexander Dickon Tulloch, North Yorkshire (GB)

(73) Assignee: Dorf Ketal Chemicals (India) Pvt. Ltd, Mumbai (IN)

( * ) Notice: Subject to any disclaimer, the term of this patent is extended or adjusted under 35 U.S.C. 154(b) by 661 days.

(21) Appl. No.: 12/297,114

(22) PCT Filed: Apr. 4, 2007

(86) PCT No.: PCT/GB2007/050180
§ 371 (c)(1),
(2), (4) Date: Jul. 24, 2009

(87) PCT Pub. No.: WO2007/119078
PCT Pub. Date: Oct. 25, 2007

(65) Prior Publication Data
US 2010/0010144 A1   Jan. 14, 2010

(51) Int. Cl.
*C08G 79/00* (2006.01)
*C08L 85/00* (2006.01)
*C08K 5/42* (2006.01)
*C08K 5/057* (2006.01)

(52) U.S. Cl.
CPC . *C08L 85/00* (2013.01); *C08K 5/42* (2013.01); *C08K 5/057* (2013.01); *C08G 79/00* (2013.01)
USPC ............................. 525/353; 525/370; 525/389

(58) Field of Classification Search
CPC ............. C08K 5/42; C08K 5/057; C08I 85/00
USPC ........... 523/160, 161; 524/500; 525/389, 353, 525/370
See application file for complete search history.

(56) References Cited

U.S. PATENT DOCUMENTS

| 3,551,378 | A | * | 12/1970 | Rabenold et al. | 523/522 |
| 4,043,952 | A | * | 8/1977 | Ganslaw et al. | 524/399 |
| 5,334,690 | A | | 8/1994 | Schafheutle et al. | |
| 2003/0173026 | A1 | * | 9/2003 | Wu et al. | 156/329 |
| 2004/0086943 | A1 | * | 5/2004 | Andres et al. | 435/7.1 |
| 2004/0141942 | A1 | * | 7/2004 | Rollat et al. | 424/70.17 |

FOREIGN PATENT DOCUMENTS

| DE | 42 22 530 A1 | 1/1994 |
| GB | 2 161 811 A | 1/1986 |
| WO | WO-03/076546 A1 | 9/2003 |
| WO | WO 03076546 A1 * | 9/2003 |
| WO | WO-2004/044027 A1 | 5/2004 |
| WO | WO-2005/049662 A1 | 6/2005 |
| WO | WO-2005/058996 A1 | 6/2005 |
| WO | WO-2005/097919 A1 | 10/2005 |
| WO | WO 2005097919 A1 * | 10/2005 |
| WO | WO-2007/003966 A1 | 1/2007 |

OTHER PUBLICATIONS

Snapshot of the Polyglycol Calculation of Molecular Weight from OH# website: https://dow-answer.custhelp.com/app/answers/detail/a_id/9945/~/polyglycol-calculation-of-molecular-weight-from-oh%/23 taken Sep. 19, 2011.*

* cited by examiner

*Primary Examiner* — Mark Kaucher
(74) *Attorney, Agent, or Firm* — Conley Rose, P.C.; Rodney B. Carroll

(57) ABSTRACT

The invention comprises an adhesion promoter for a printing ink and a printing ink comprising the adhesion promoter. The adhesion promoter comprises the product of reacting together (a) a solution of a polymer or synthetic resin (b) a sulphonic acid or a derivative of a sulphonic acid, and (c) a metal compound selected from one or more of the group consisting of a metal halide, metal alkoxide, metal halo-alkoxide or a condensed metal alkoxide, wherein the metal is selected from titanium or zirconium.

25 Claims, No Drawings

ADHESION PROMOTING COMPOUND

CROSS REFERENCE TO RELATED APPLICATIONS

This application is the U.S. National Phase application of PCT International Application No. PCT/GB2007/050180, filed Apr. 4, 2007, and claims priority of British Patent Application No. 0607479.3, filed Apr. 13, 2006, both of which are incorporated herein by reference.

FIELD OF THE INVENTION

The present invention relates to adhesion promoters, in particular for improving the adhesion of a printing ink to a substrate to which the ink is applied, and to printing ink formulations containing the adhesion promoters.

BACKGROUND OF THE INVENTION

Adhesion promoting compounds are used in commercial ink formulations in order to enhance the adhesion between the ink and the substrate onto which the ink is printed. Failure of adhesion leads to difficulties in the printing process or inadvertent removal of the print. Printing of polymeric food packaging is widespread and it is particularly important in such applications that the printed ink remains on the packaging and that parts of the ink composition do not contaminate the product.

Adhesion promoters based upon titanium compounds have been known and used commercially for many years. Whilst providing good adhesion between the ink and substrate, simple titanium compounds such as titanium acetylacetonates have tended to impart undesirable yellow colour and odour to the ink. GB-A-2161811 describes an adhesion promoter which is an organotitanate comprising the reaction product of a titanium orthoester and at least a monoalkyl phosphate (for example a mixture of a monoalkyl phosphate and a dialkyl phosphate) in which the alkyl group contains up to 6 carbon atoms and in which the total mole ratio P:Ti in the product is less than 2. Such compositions provide efficient adhesion promotion with much less yellowing and odour than the aforementioned titanium compounds and have been successful commercially. WO2005/049662 and WO2005/097919 each describe alternative adhesion promoters made by reacting together a titanium compound, a phosphorus compound and a resin.

SUMMARY OF THE INVENTION

We have now made an adhesion promoter for ink which has improved properties compared with the compositions of the prior art and which avoids the incorporation of organophosphate compounds into the ink formulation.

According to the invention, we provide an adhesion promoter, suitable for use in printing ink formulations for promoting the adhesion of the printing ink to a substrate, comprising the product of reacting together
(a) a solution of a polymer or synthetic resin
(b) a sulphonic acid or a derivative of a sulphonic acid, and
(c) a metal compound selected from one or more of the group consisting of a metal halide, metal alkoxide, metal halo-alkoxide or a condensed metal alkoxide, wherein the metal is selected from titanium or zirconium.

According to a second aspect of the invention, we provide a printing ink comprising:
i) a polymeric binder,
ii) a solvent for the polymeric binder, and
iii) an adhesion promoter, comprising the product of reacting together
(a) a solution of a polymer or synthetic resin
(b) a sulphonic acid or a derivative of a sulphonic acid, and
(c) a metal compound selected from one or more of the group consisting of a metal halide, metal alkoxide, metal halo-alkoxide or a condensed metal alkoxide, wherein the metal is selected from titanium or zirconium.

According to a third aspect of the invention, we provide a method for manufacturing an adhesion promoting compound, comprising the steps of
(a) mixing a solution of a polymer or synthetic resin with a sulphonic acid or a derivative of a sulphonic acid and then
(b) mixing the mixture formed in step (a) with a metal compound selected from one or more of the group consisting of a metal halide, metal alkoxide, metal halo-alkoxide or a condensed metal alkoxide, wherein the metal is selected from titanium or zirconium.

DETAILED DESCRIPTION OF THE INVENTION

In this specification, the terms "adhesion promoter" and "adhesion promoting compound" have essentially the same meaning and may be used interchangeably.

The polymer or synthetic resin is preferably a hydroxyl-containing resin which is suitable for use in printing inks. Suitable hydroxyl-containing resins preferably have a hydroxyl number of from about 100 to about 500, especially from about 200 to about 400 mg KOH/g (tested according to DIN 53 240). Examples of suitable synthetic resins include ketone-aldehyde resins especially ketone-formaldehyde resins such as hydrogenated acetophenone formaldehyde condensation resins, cyclohexanone-formaldehyde condensation resins and urethane-modified ketone aldehyde resins. Such resins are available from Degussa AG as Synthetic Resins 1201, CA and SK, for example.

The polymer or synthetic resin is dissolved in a suitable solvent such as an alcohol or an ester, for example propyl acetate, ethyl acetate, ethanol or mixtures thereof. The solution preferably contains from about 10% to 70% of the resin (by weight), especially from 20% to 60% resin by weight. The amount of resin used depends upon its solubility in the solvent and the mobility of the final adhesion promoting compound.

The sulphonic acid compound is selected from any readily available organic sulphonic acid including alkyl and aryl sulphonic acids. Examples of suitable sulphonic acids include methane sulphonic acid and dodecylbenzene sulphonic acid. Derivatives of these sulphonic acids are also suitable, for example alkali metal salts such as the sodium salt and quaternary ammonium salts or derivatives formed by reaction of the sulphonic acid with an amine to form a sulphonamide. Suitable amines include but are not limited to alkyl amines, particularly tertiary amines, and alkanolamines of which ethanolamines are preferred. The sulphonic acid derivative may be formed either before or after the sulphonic acid has been mixed with the polymer/resin, metal compound, mixture or reaction product of any of them. For example the product of reacting together the polymer, metal compound and sulphonic acid may be reacted with a base to form a sulphonic acid derivative to increase the pH of the product. In a preferred embodiment, at least some of the sulphonic acid, or the sulphonic acid residues in the reaction product with the metal compound and the resin, is reacted with triethanolamine. The term "sulphonic acid" used in this specification is intended to mean "a sulphonic acid or a derivative of a sulphonic acid" unless the context indicates otherwise. The sulphonic acid may be mixed with or dissolved in a solvent or other miscible diluent prior to mixing with the other reactants. Suitable solvents or diluents include alkyl alcohols and alkyl esters such as ethanol, propanol, butanol, propyl acetate and ethyl acetate.

The metal compound is selected from one or more of the group consisting of a metal halide, metal alkoxide, metal halo-alkoxide or a condensed metal alkoxide and may comprise a mixture of these compounds. Preferably the metal is titanium and preferred titanium compounds include titanium alkoxides having a general formula $Ti(OR)_4$ in which R is an alkyl group, preferably having from 1 to 8 carbon atoms. Each R group may be the same as or different from the other R groups. Particularly suitable alkoxides include tetra-isopropoxy titanium (tetraisopropyl titanate), tetra-n-butoxy titanium (tetra"-butyl titanate) and tetraethoxy titanium (tetraethyl titanate). Zirconium alkoxides such as zirconium n-propoxide may also be used.

The condensed alkoxides are typically prepared by careful hydrolysis of titanium alkoxides and may be represented by the formula $R^1O[Ti(OR^1)_2O]_nR^1$ in which $R^1$ represents an alkyl group. Preferably, n is less than 20 and more preferably is less than 10. Preferably $R^1$ contains 1 to 6 carbon atoms and useful condensed alkoxides include the compounds known as polybutyl titanate and polyisopropyl titanate.

The amount of the resin solution, titanium compound and sulphonic acid used to make the adhesion promoter depends to some extent upon the nature of the compounds selected. It is preferred that the amount of metal compound and resin provide a mole ratio of OH:Ti or Zr in the range from 0.25:1-4:1, more preferably 0.5-2:1, where the OH content is the amount of OH derived from the resin component calculated on the basis of the hydroxyl value of the resin expressed as mg KOH/g.

The amount of sulphonic acid and metal compound used is preferably selected to provide a mole ratio of $SO_3X$ groups to Ti or Zr atoms in the range from 0.25-2:1 and is often in the region of 0.5-1.75:1. $SO_3X$ represents a sulphonic acid or sulphonic acid derivative functional group where X represents a H atom or the residue of a base such as a metal, quaternary ammonium or amino moiety.

The adhesion promoter may be made by mixing the reactants in any order. It is preferred to mix first a solution of the resin with the sulphonic acid and then mix the resultant mixture with the metal compound. It is preferred that the metal compound is added to the mixture of resin solution and sulphonic acid. It is also possible, but less preferred, to add the mixture of resin solution and sulphonic acid to the metal compound. The mixing of the resin solution with the sulphonic acid may be accompanied by a visible colour change and/or an exotherm, indicating a reaction between the components of the mixture. The reaction of the resin/sulphonic acid compound mixture with the metal compound is usually exothermic and may also result in a thickening of the mixture. The exotherm may be controlled by cooling the reaction mixture and adding the metal compound slowly and with care. Where thickening occurs, the addition of more of the metal compound may result in reducing the viscosity of the mixture.

Alternatively the adhesion promoter may be made by first mixing together the metal compound with a solution of the resin and then adding the sulphonic acid to the resulting mixture. As a still further alternative, the sulphonic acid may be reacted with the metal compound and the resulting mixture then added to a solution of the resin. When the components of the adhesion promoter are mixed together there may be some side products formed. Typically, when a metal alkoxide is reacted with the resin or with a sulphonic acid, a molecule of alcohol is displaced from the metal. This alcohol may be removed from the reaction mixture if required, by distillation or another suitable method. Normally the alcohol remains in the adhesion promoter mixture and it is therefore desirable to select suitable metal compounds to ensure that the by-products do not impart undesirable properties to the adhesion promoter or an ink composition in which the adhesion promoter is intended to be used.

The adhesion promoter product may additionally comprise a solvent or miscible diluent. The reaction product of the metal compound, resin and sulphonic acid may be mixed with a suitable solvent or diluent such as an alcohol, especially an alkyl alcohol and alkyl esters such as ethanol, propanol, butanol, propyl acetate and ethyl acetate. Particularly suitable solvents or diluents include ethanol or propanol, especially in the form of denatured alcohols, i.e. mixtures of alcohols and optionally other compounds.

The adhesion promoter of the present invention may be useful in various coating compositions, e.g. for metal etc. but it is of particular use in flexographic and gravure inks containing a polymeric binder which is cross-linkable and which is dissolved in an appropriate organic solvent. The printing inks of the invention are also typically of this type. Typical binders used in such inks are those based on nitrocellulose or ester type modified cellulose, e.g. cellulose acetate propionate. Often such polymeric binders are employed in mixed form with polyamides, polyurethanes or other resins. The ink also usually contains one or more pigments and/or one or more dyes. Typical pigments which can be used are the coloured inorganic pigments, white inorganic pigments and coloured organic pigments. Organic dyes can be used to render the ink an appropriate colour and often are used in conjunction with an opacifying white inorganic pigment such as titanium dioxide. The printing ink of the present invention need not necessarily include a pigment and/or a dye. Where no pigment or dye is present, the ink composition is often referred to as a varnish. Varnishes may be prepared for application in an unpigmented state to a substrate or they may be prepared for the later preparation of a coloured ink or coating by the addition of a pigment or dye, which may itself be dispersed as a concentrate or master batch in a quantity of a similar ink composition. The inks of the present invention can contain other additives such as slip aids and plasticisers.

The inks of the present invention usually contain the adhesion promoter in an amount of up to 10% by weight of the total weight of ink and preferably in an amount of 1 to 6% by weight of the ink. We have found that the adhesion promoters of the present invention are particularly effective and they may therefore be employed at lower concentrations than known adhesion promoters. Therefore in some applications the adhesion promoters are added to the ink in an amount of 1-3% of the total weight of the ink. When the adhesion promoter is used in a masterbatch composition, the concentration may be much greater, e.g. up to 20%, but this would normally be diluted with other components of the ink before printing.

The inks of the present invention are of particular use in printing substrates formed of polymeric materials, especially films, such as those used in packaging, especially food packaging. Examples of such substrates include polyester, polypropylene, polyethylene or co-extruded polypropylene/ polyethylene film or sheets and polyvinylidene dichloride coated plastics material but this list is not intended to be limiting.

EXAMPLES

The invention will be further demonstrated in the following examples.

Ink Adhesion Test

The adhesion promoter compound to be tested was added to a $TiO_2$ base test ink (described below) and mixed. Ink drawdowns were made on a corona-discharge-treated polypropylene film using a number 2 K-bar. Films were dried by making four passes over a silica bar at 60° C. and then a tape adhesion test was made using 50 mm wide red opaque Scapa tape "Cellulose Splice Red Tape Type 1112". Results are determined by the percentage ink remaining in the test area after removal of the adhesive tape. Two inks to be compared are applied side-by-side to the same substrate film and a single strip of the adhesive tape is placed over both print samples together to ensure that the test conditions are identical. In this series of tests, one ink sample contained an adhesion promoter as noted in the Table whilst the other ink was a control, containing no adhesion promoter. The amount of ink of each type remaining on the substrate can then be compared directly. The amount of ink remaining on the substrate is expressed as a percentage of the ink before the test.

Test Ink

A standard test ink is made using the following ingredients, given as parts by weight.

| Ingredient | Solution 1 | Solution 2 |
| --- | --- | --- |
| Denatured alcohol | 62.6 | 75.2 |
| Ethyl acetate | 93.9 | 112.7 |
| Nitrocellulose DLX 3/5* | 57.4 | 68.9 |
| Sylvaprint 8250** | — | 10.0 |
| SK Resin*** | — | 25.1 |
| $TiO_2$ pigment | 365.4 | — |
| Solution 2 | 243.2 | — |
| Polyurethane Resin**** | 177.5 | — |
| Total | 1000.0 | |

*from Nobel Enterprises
**a rosin derivative, from Arizona Chemical
***from Degussa AG
****Unithane ™ 671S from Cray Valley Ltd Prepare Solutions 1 and 2. Add the $TiO_2$ to Solution 1 and disperse. Add Solution 2 to the millbase and mix. Add the PU and mix. Filter and adjust to printing viscosity with 50:50 ethyl acetate/alcohol (approx. 25 s No. 2 Zahn cup). The adhesion promoter is added as the final component of the ink and mixed. The amount of adhesion promoter used is shown in the table. The ink was printed and tested for adhesion immediately after mixing with the adhesion promoter. Some samples of ink were then allowed to age for up to two weeks before being printed and testing. The results from these samples gives an indication of the pot-life of the adhesion promoter.

Example 1 (Comparative)

A 50% (w/w) solution of "Synthetic Resin SK"™ available from Degussa AG and having a hydroxyl number of about 325 (according to the manufacturer's data sheet), was made up in n-propyl acetate. This solution will be referred to hereinafter as SK50 solution. To 87.7 g of the SK50 solution was added 50.7 g (0.25 mole) of amyl acid phosphate (approx 1:1 mono and di esters) with mixing. The solution colour changed from very pale yellow to orange. When all of the phosphate had been added to the resin solution and the solution had been mixing for 5 minutes, 71 g (0.25 mole) of tetra(isopropyl) titanate (VERTEC™ TIPT available from Johnson Matthey Catalysts) was added to the orange solution slowly with mixing. The mixture thickened on addition of the TIPT but became thinner as the addition progressed. When the addition was complete the product was mixed for a further 5 minutes and then transferred to an air-tight sample container. The sample product was then added to the Test Ink formulation as given above, and tested to assess the adhesion-promoting effect as described in the ink test, above. The results are shown in Table 1.

Example 2

116.5 g of a 70% solution of dodecylbenzenesulphonic acid in iso-propanol was added to 87.7 g of the SK50 solution, with mixing. The solution changed from very pale yellow to orange. The solution was allowed to mix for 5 minutes, and then 71 g (0.25 mole) of tetra(isopropyl)titanate (VERTEC™ TIPT available from Johnson Matthey Catalysts) was added to the orange solution slowly with mixing. The mole ratio of sulphonic acid to titanium was 1:1. The mole ratio of hydroxyl groups on the resin to titanium atoms was approximately 1:1. When the addition was complete the product was mixed for a further 5 minutes and then transferred to an air-tight sample container. The sample product was then added to the Test Ink formulation as given above, and then tested to assess the adhesion-promoting effect as described in the ink test, above. The results are shown in Table 1.

Example 3

The preparation described in Example 2 was repeated except that only 58.3 g of the dodecylbenzenesulphonic acid solution was used, to give a mole ratio of sulphonic acid to titanium of 0.5:1.

Example 4

71 g (0.25 mole) of tetra(isopropyl)titanate was added to 87.7 g of the SK50 solution, with mixing. The solution was allowed to mix for 5 minutes, and then 116.5 g of a 70% solution of dodecylbenzenesulphonic acid in iso-propanol was added to the resulting solution slowly with mixing. The mole ratio of sulphonic acid to titanium to hydroxyl groups on the resin was 1:1:1. When the mixture was complete the product was transferred to an air-tight sample container. The sample product was then added to the Test Ink formulation as given above, and then tested to assess the adhesion-promoting effect as described in the ink test, above. The results are shown in Table 1.

Example 5 (Comparative)

An ink was made up using the same test ink formulation but using as the adhesion promoter a commercial product, VERTEC™ PI2 which is an adhesion promoter containing acetylacetone.

TABLE 1

| Adhesion promoter | % by weight of adhesion promoter | | | | |
|---|---|---|---|---|---|
| | 1% | 2% | 3% Fresh | 1 week | 2 week |
| None (comparative) | 20 | 20 | 20 | 20 | 20 |
| Example 1 (comp) | — | 82 | 98 | 98 | 98 |
| Example 2 | 95 | 100 | 100 | 100 | 100 |
| Example 3 | 85 | 98 | 100 | 100 | 100 |
| Example 4 | 97 | 100 | 100 | 100 | 100 |
| Example 5 (comp) | — | — | 98 | 98 | 98 |

Example 6

388.5 g of a 50% solution of dodecylbenzenesulphonic acid in iso-propanol was added to 195 g of the SK50 solution slowly with mixing. 246 g of a 75% solution of tetra(n-propyl)zirconate in n-propanol (0.56 mole of Zr) was added to the solution slowly with mixing. When the addition was complete the product was mixed for a further 5 minutes and then transferred to an air-tight sample container. The mole ratio $OH:SO_3H:Zr$ in the product was 1.0:1.1:1.0. The sample product was then added to the Test Ink formulation as given above, and then tested to assess the adhesion-promoting effect as described in the ink test, above. The results are shown in Table 2.

Example 7

353 g of a 50% solution of dodecylbenzenesulphonic acid in iso-propanol was added to 189 g of the SK50 solution (0.54 mole of OH) slowly with mixing. 154 g (0.54 mole) of tetra (isopropyl)titanate was added to the solution slowly with mixing. 59.8 g (0.40 mole) of triethanolamine was added to the resulting solution and the pH increased from 2.5 to about 5. When the addition was complete the product was mixed for a further 5 minutes and then transferred to an air-tight sample container. The sample product was then added to the Test Ink formulation as given above, and then tested to assess the adhesion-promoting effect as described in the ink test, above. The results are shown in Table 2.

TABLE 2

| Adhesion promoter | Adhesion % |
|---|---|
| None (comparative) | 70 |
| Example 6 | 100 |
| Example 7 | 100 |

Example 8

252 g (0.39 mole of $SO_3H$) of a 50% solution of dodecylbenzenesulphonic acid in iso-propanol was added to 127 g of a 54% solution of the SK resin in n-propyl acetate (0.39 mole of hydroxyl), with mixing. The solution changed from very pale yellow to orange. The solution was allowed to mix for 5 minutes, and then 110 g (0.39 mole) of tetra(isopropyl)titanate (VERTEC™ TIPT available from Johnson Matthey Catalysts) was added to the orange solution slowly with mixing. The mole ratio of sulphonic acid to titanium was 1:1. The mole ratio of hydroxyl groups on the resin to titanium atoms was approximately 1:1. When the addition was complete the product was mixed for a further 5 minutes and then diluted with a TSDA (Trade Specific Denatured Alcohol containing approx 96% ethanol with n-propanol and ethyl acetate) to give a product containing 1.86% of Ti by weight.

Example 9

The procedure of Example 8 was repeated but using only 189 g of the 50% solution of dodecylbenzenesulphonic acid in iso-propanol to give a product having a mole ratio of $OH:SO_3H:Ti$ of 1:0.75:1.

Example 10

252 g (0.77 mole of $SO_3H$) of 100% dodecylbenzenesulphonic acid in iso-propanol was added to 254 g of a 54% solution of the SK resin in n-propyl acetate (0.78 mole of hydroxyl), with mixing. The solution changed from very pale yellow to brown. The solution was allowed to mix for 5 minutes, and then 220 g (0.78 mole) of tetra(isopropyl)titanate (VERTEC™ TIPT available from Johnson Matthey Catalysts) was added to the brown solution slowly with mixing. The mole ratio of resin hydroxyl groups to sulphonic acid to titanium was approximately 1:1:1. When the addition was complete the product was mixed for a further 5 minutes. TSDA was added to give a product containing 3.71% by weight of Ti.

Example 11

The procedure of Example 10 was repeated but the TIPT was replaced by 177 g (0.78 mole) tetraethyl titanate to produce a product having a mole ratio of $OH:SO_3H:Ti$ of 1:1:1. TSDA was added to give a product containing 2.48% by weight of Ti.

Example 12

The procedure of Example 10 was repeated but using a 54% solution of the SK resin in ethyl acetate instead of propyl acetate. The mole ratio $OH:SO_3H:Ti$ in the product was 1:1:1. TSDA was added to give a product containing 4.66% by weight of Ti.

Example 13 Odour Test

The adhesion promoter was added to the Test Ink at a concentration of 3% by weight and ink drawdowns were made on polypropylene film (Propafilm RGP30 OPP form Innovia Films) using a number 2 K-bar. Films were dried by making two passes over a silica bar at 60° C. Samples of printed film were then stored in sealed glass jars for 48 hours at 40° C. The odour of the printed films was then assessed by a panel of 5 people on a scale from 1=no perceptible odour to 4=very strong odour. The results are shown in Table 3.

Example 14 Colour Test

The adhesion promoter was added to the Test Ink at a concentration of 3% by weight and ink drawdowns were made on 50 micron Melinex 454 Polyester film from DuPont Teijin Films using a number 2 K-bar. Films were dried by making two passes over a silica bar at 60° C. Gardner CIELAB measurements were made using a BYK Gardner "color view" instrument. The results are shown in Table 3 and are given as a and b values. A more negative "a" value indicates a green colouration and a higher "b" value indicates a more yellow colour.

TABLE 3

| Adhesion promoter | Odour | Colour a | Colour b |
|---|---|---|---|
| None* | 2.6 | −0.58 | 2.36 |
| VERTEC ™ PI2* | 3.8 | −1.44 | 4.84 |
| Example 1* | 2.1 | −0.69 | 2.64 |
| Example 8 | 1.5 | −0.73 | 2.61 |

*indicates a comparative example.

Example 15 Adhesion Test

A modified adhesion test was carried out in which the printed ink samples were allowed to dry at room temperature (about 20° C.) instead of being dried over the silica bar at 60° C. The test ink, substrate, mode of application and tape adhesion test method were otherwise the same as those described in the Ink Adhesion Test above. Printed samples were tested at intervals up to 60 minutes after printing. The results, shown as % adhesion in Table 4, show that the inks containing adhesion promoters of the invention have an adhesion as good as that measured for an ink containing the VERTEC PI2 product but have significantly less odour and colour. The adhesion develops rapidly at room temperature which provides benefits for the printer.

TABLE 4

| Adhesion Promoter | Wt % in ink | Time after printing (minutes) | | | | |
|---|---|---|---|---|---|---|
| | | 1 | 5 | 15 | 30 | 60 |
| None* | — | | | | | 40 |
| VERTEC ™ PI2* | 2 | 50 | 95 | 95 | 98 | 100 |
| VERTEC ™ PI2* | 4 | 85 | 95 | 98 | 100 | 100 |
| Example 1* | 2 | 80 | 85 | 85 | 90 | 90 |
| Example 1* | 4 | 90 | 95 | 95 | 95 | 95 |
| Example 8 | 2 | 80 | 90 | 90 | 95 | 95 |
| Example 8 | 4 | 95 | 98 | 98 | 98 | 100 |
| Example 9 | 2 | 70 | 85 | 85 | 85 | 85 |
| Example 9 | 4 | 85 | 95 | 98 | 100 | 100 |
| Example 10 | 2 | 98 | 98 | 98 | 98 | 98 |
| Example 10 | 4 | 98 | 100 | 100 | 100 | 100 |

*indicates a comparative example.

The invention claimed is:

1. An adhesion promoter, suitable for use in printing ink formulations for promoting the adhesion of the printing ink to a substrate, comprising the product of a reaction between reactants, wherein the reactants comprise:
   (a) a solution of a polymer,
   (b) a sulphonic acid or a derivative of a sulphonic acid, and
   (c) a metal compound selected from one or more of the group consisting of a metal halide, metal alkoxide, metal halo-alkoxide and a condensed metal alkoxide, wherein the metal is selected from titanium or zirconium,
   wherein an amount of sulphonic acid or sulphonic acid salt used and an amount of metal compound used is selected to provide a mole ratio of $SO_3X$ groups to Ti or Zr atoms in the range from 0.25-2:1 where X represents a H atom or a residue of a base.

2. An adhesion promoter according to claim 1, wherein the polymer is a synthetic hydroxyl-containing resin which is suitable for use in printing inks.

3. An adhesion promoter according to claim 2, wherein the hydroxyl-containing resin has a hydroxyl number of from about 100 to about 500 in mg KOH/g as tested according to DIN 53 240.

4. An adhesion promoter according to claim 1, wherein the metal compound is a titanium or zirconium alkoxide having a general formula $M(OR)_4$ in which M represents titanium or zirconium, R is an alkyl group having from 1 to 8 carbon atoms and each R group is the same as or different from each other R group.

5. An adhesion promoter according to claim 4, wherein M is titanium.

6. An adhesion promoter according to claim 1, wherein the amount of resin used and the amount of metal compound used provide a mole ratio of OH:metal atoms in the range from 0.25:1 to 4:1, where the OH content is the amount of OH derived from the resin component calculated on the basis of the hydroxyl number of the resin expressed as mg KOH/g and the metal atoms are titanium or zirconium atoms derived from the metal compound.

7. An adhesion promoter according to claim 1, wherein the mole ratio of $SO_3X$ groups to Ti or Zr atoms is in the range from 0.5-1.75:1.

8. An adhesion promoter according to claim 1, further comprising a residue of a base.

9. An adhesion promoter according to claim 1, further comprising a solvent or miscible diluent.

10. An adhesion promoter according to claim 1, wherein the polymer comprises a synthetic resin.

11. An adhesion promoter according to claim 3, wherein the hydroxyl-containing resin has a hydroxyl number of from about 200 to about 400 in mg KOH/g as tested according to DIN 53 240.

12. A printing ink comprising:
   at least one polymeric binder,
   a solvent for the polymeric binder, and
   an adhesion promoter, according to claim 1.

13. A printing ink according to claima 12, further comprising a compound selected from the group consisting of a dye, a pigment and an opacifier.

14. A printing ink according to claim 12, wherein the adhesion promoter is present at a concentration of from 1 to 20% by weight, based upon the total weight of the ink.

15. A printing ink according to claim 14, wherein the adhesion promoter is present at a concentration of from 1 to 6% by weight, based upon the total weight of the ink.

16. A method for manufacturing the adhesion promoter of claim 1, comprising reacting together
   (i) a solution of a polymer
   (ii) a sulphonic acid or a derivative of a sulphonic acid, and
   (iii) a metal compound selected from one or more of the group consisting of a metal halide, metal alkoxide, metal halo-alkoxide and at condensed metal alkoxide, wherein the metal is selected from titanium or zirconium,
   wherein an amount of sulphonic acid or sulphonic acid salt used and an amount of metal compound used is selected to provide a mole ratio of $SO_3$ X groups to Ti or Zr atoms in the range from 0.25 -2:1 where X represents a H atom or a residue of a base.

17. A method according to claim 16 comprising the steps of;
   (a) mixing the solution of a polymer with the sulphonic acid or derivative thereof and then
   (b) mixing the mixture formed in step (a) with the metal compound.

18. A method according to claim 16 comprising the steps of:
   (a) mixing the solution of a polymer with the metal compound and then
   (b) mixing the mixture formed in step (a) with the sulphonic acid or derivative thereof.

19. A method according to claim 16 comprising the steps of:
(a) mixing the metal compound with the sulphonic acid or derivative thereof and then
mixing the mixture formed in step (a) with the solution of a polymer.

20. A method according to claim 16, further comprising the step of reacting the reaction product formed with a base to form a product which is at least partially neutralised.

21. A method according to claim 20, wherein said base is selected from the group consisting of a metal hydroxide, a quaternary ammonium compound and an organic amine.

22. A method according to claim 16, further comprising the step of mixing the reaction product with a solvent.

23. A method according to claim 20, further comprising the step of mixing the at least partially neutralised product with a solvent.

24. A method according to claim 16, wherein the sulphonic acid or derivative thereof is mixed with a solvent prior to mixing with the other reactants, 25. A method according to claim 16, wherein the polymer comprises a synthetic resin.

\* \* \* \* \*

UNITED STATES PATENT AND TRADEMARK OFFICE
CERTIFICATE OF CORRECTION

PATENT NO.         : 8,722,811 B2
APPLICATION NO.    : 12/297114
DATED              : May 13, 2014
INVENTOR(S)        : Robert Hume Duncan et al.

It is certified that error appears in the above-identified patent and that said Letters Patent is hereby corrected as shown below:

In the Claims:

In Column 10, line 31, replace "at least one" with --i) at least one--

In Column 10, line 32, replace "a solvent for" with --ii) a solvent for--

In Column 10, line 33, replace "an adhesion" with --iii) an adhesion--

In Column 10, line 34, replace "claima" with --claim--

In Column 10, line 57, replace "of;" with --of:--

Signed and Sealed this
Eighth Day of July, 2014

Michelle K. Lee
*Deputy Director of the United States Patent and Trademark Office*

UNITED STATES PATENT AND TRADEMARK OFFICE
CERTIFICATE OF CORRECTION

PATENT NO.        : 8,722,811 B2                                            Page 1 of 1
APPLICATION NO.   : 12/297114
DATED             : May 13, 2014
INVENTOR(S)       : Duncan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1080 days.

Signed and Sealed this

Twenty-ninth Day of September, 2015

Michelle K. Lee
*Director of the United States Patent and Trademark Office*